United States Patent [19]

De Thieulloy et al.

[11] 3,827,074

[45] July 30, 1974

[54] TRANSMISSION DEVICE FOR MULTIPLEX TRANSMISSION BETWEEN A TELEVISION CAMERA AND ITS CONTROL UNIT

[75] Inventors: Bernard De Thieulloy; Claude Claverie, both of Paris, France

[73] Assignee: Thomson-CSF, Paris, France

[22] Filed: Jan. 4, 1972

[21] Appl. No.: 215,348

[30] Foreign Application Priority Data

Nov. 8, 1971 France ............................ 71.39926

[52] U.S. Cl. .................... 358/15, 358/41, 178/7.2

[51] Int. Cl. ........ H04n 7/10, H04n 7/12, H04n 7/14

[58] Field of Search ............... 178/5.2 R, 5.6, 5.4 R, 178/DIG. 15, DIG. 23, DIG. 13

[56] References Cited

UNITED STATES PATENTS

| | | | |
|---|---|---|---|
| 2,874,213 | 2/1959 | Beers | 178/DIG. 23 |
| 2,978,538 | 4/1961 | Breese | 178/DIG. 15 |
| 3,215,774 | 11/1965 | Ikegami | 178/DIG. 15 |
| 3,436,471 | 4/1969 | Mounts et al. | 178/DIG. 23 |
| 3,534,160 | 10/1970 | Lowenstein | 178/5.4 R |
| 3,668,307 | 3/1970 | Face | 178/5.6 |
| 3,689,689 | 3/1970 | Weitzsch | 178/5.2 R |

*Primary Examiner*—Harvey E. Springborn
*Attorney, Agent, or Firm*—Cushman, Darby & Cushman

[57] ABSTRACT

In a two-way transmission device for multiplex transmission between a camera and its control unit, the control unit combines the narrow band control signals for the camera into a time-multiplex signal having a zero direct component and a frequency band comprised between 50 kc/s and 2 mc/s, different sampling frequencies being used for the narrow-band signals according to their bandwidths. In addition to this time-multiplex signal, which is transmitted as such, i.e., not being frequency-translated, or modulated on a carrier, the control unit transmits electrical power at zero frequency and a 58 mc/s carrier modulated by a video signal intended for the camera view-finder. The camera transmits to the control unit the three video signals which it produces, on three carriers at 9, 22 and 36 mc/s. The service informations which the control unit has to receive from the camera are transmitted by means of pulses incorporated in the video signals during horizontal blanking intervals.

5 Claims, 6 Drawing Figures

TRANSMISSION DEVICE FOR MULTIPLEX TRANSMISSION BETWEEN A TELEVISION CAMERA AND ITS CONTROL UNIT

The present invention relates to a device for transmitting electrical power and electrical signals between a television camera and its control unit.

Those skilled in the art will be aware that the control unit has to transmit to the camera electrical power, synchronising signals and various control and other auxiliary signals, all these signals being referred to hereinafter as "narrow-band signals" to distinguish them from video signals. If the camera is equipped with an electronic view-finder, the control unit must also supply the corresponding television signal.

The camera must transmit to the control unit the video signal (or video signals) which it produces, as well as various narrow-band signals.

It has been proposed that the electrical power should be transmitted at zero frquency and all the other signals, including video signals transmitted in different frequency-multiplex channels.

In order to abbreviate the terminology to be used, the following terms will be used;

— "go" to designate the direction of transmission from the control unit to the camera;

— "return" to designate the reverse direction of transmission

— "video signal" to designate an image-signal;

— "narrow-band signal" a signal which has a relatively narrow band compared with a video signal;

— "M" signal, the signal resulting from time-division multiplexing of the narrow-band signals to be transmitted in the go direction.

The object of the present invention is to enable proper transmission of signals within a limited frequency spectrum by various arrangements the chief of which is to produce the M signal in the form of a signal with a zero d.c. component, and to transmit it in its own frequency band (i.e., to transmit it without any handling, such as modulation of this signal on a carrier or frequecy translation, resulting in a change in the frequency band occupied by this signal).

In addition, different sampling frequencies are used for the different signals to be time-multiplexed, according to the bandwidths of those signals. The electrical power is transmitted from the control unit to the camera at zero frequency.

The invention will be better understood and other of its features rendered apparent from a consideration of the ensuing description and of the attached drawings relating thereto in which:

FIG. 1 illustrates the allocation of the spectrum of frequencies which can be transmitted by a single cable in an embodiment of the device according to the invention FIG. 2 is a diagram of an ambodiment of the time-division multiplexing device in accordance with the invention;

FIGS. 3*a* and 3*b* are diagrams illustrating various signals which appear in the circuit of FIG. 2;

Figure 1:
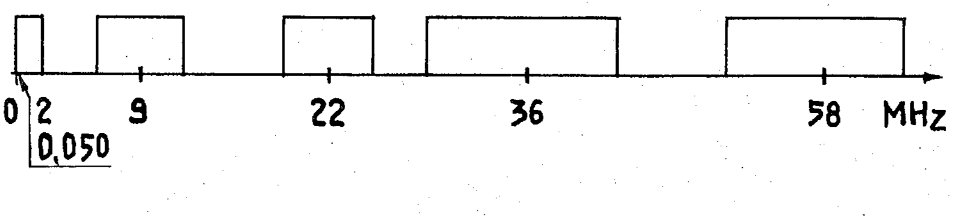

In the drawings, the inputs or outputs of one and the same block having similar functions have not been all shown, when their number appeared too high. In such cases, this has been conventionaly indicated through drawing one of the shown inputs or outputs in dashed line. For example, in FIG. 2, the 45 outputs of matrix 31 have been shown in this way.

The invention will be described more particularly in relation to the case of a colour television camera.

It will be assumed that the signals to be transmitted are as follows:

I. In the "go" direction:

a. The M signal resulting from the time-division multiplexing of 45 "narrow-band" signals; among these 45 signals, those having the maximum bandwidths are two low-frequency signals with bandwidths of 2 kc/s, one low-frequency signal with a bandwidth of 4 kc/s, the camera field trigger signal and the control voltage for the camera pilot oscillator, the other 40 signals having bandwidths of less than 200 c/s.

Frequency band of the M signal: 50 kc/s – 2 mc/s approximately.

b. A video signal designed for the camera view-finder, bandwidth 7 mc/s at – 3 dB.

II. In the "return" direction:

— a video signal known as the pseudo-luminance signal, comprising the green and parts of the blue and red. Bandwidth 7 mc/s at – 3 dB.

— two video signals, blue and red respectively, each of the bandwidth of: 3 mc/s at – 3 dB;

— several narrow-band signals.

FIG. 1 illustrates the frequency bands assigned in the composite signal to the aforementioned signals.

The blue, red and pseudo-luminance signals are transmitted by amplitude modulation of carriers whose frequencies are respectively 9, 22 and 36 mc/s.

The video signal for the view-finder is transmitted by amplitude modulation of a 58 mc/s carrier.

The narrow-band signals are transmitted in the return direction, in the manner described herinafter, by means of pulses added to the red, blue an pseudo-luminance video signals during the line-blanking intervals, and do not therefore require any supplementary frequency band.

The M signal with its zero direct component is transmitted in its own band, which is comprised approximately between 50 kc/s and 2 mc/s.

It will be observed that in this device there is no provision for the transmission of a video signal within its own frequency band (i.e., for the transmission of a video signal without frequency conversion).

In other words, experience has shown that major difficulties are encountered in transmitting the lowest frequency components (50 to 60 c/s) of the video signal because of the presence at the two ends of the link, of the choke coils necessary for the injection and reception of the electrical power. Accordingly, it is necessary to introduce some preliminary accentuation or correction of these components, with the well known consequential defects which this involves, these in particular including the amplification of low-frequency parasitic components.

In addition, the ratio between the maximum and minimum frequencies of the video signal is then such that the cable can no longer be considered as a periodic with regard to the signal once it has reached a length of some few tens of metres, and it is then necessary to introduce a correction of the cable length.

Since the M signal contains no components lower than 50 kc/s, the first of the aforesaid drawbacks disappears if it is a carrierless channel which is assigned to it. The second drawback likewise disappears if, to produce the M signal, pulses are used whose actual amplitude does not carry any information, for example, width-modulated pulses, each of which is a two-polarity pulse having a positive part with width D/2 at level + N and a negative part with width D/2 at level − N.

It will be observed, too, that the view-finder video carrier has been arranged at the upper portion of the transmitted frequency spectrum, this for the two following reasons:

a. Transmission through a variable-length cable requires a variable-gain amplifier in the demodulator. The impairment of the signal-to-noise ratio resulting from the introduction of this amplifier is the worse the higher the HF losses in the cable. It is therefore preferable to arrange this "service" video signal rather than a video signal intended for broadcasting at the upper end of the frequency band which is necessary for transmitting the different signals.

b. Since the view-finder video carrier is transmitted in the "go" direction whilst the other three carriers are transmitted in the return direction, the arrangement of the monitor video-carrier at the upper portion of the transmitted frequency spectrum facilitates problems of separation between the various channels.

Finally, the choice of the frequencies 9, 22, 36 and 58 MC/s is based upon conventional considerations of harmonics, bearing in mind that modulators are used which do not produce even harmonics.

The principles followed for the production of the M signal will now be set forth.

It will be assumed that the European 625-line 50 field standard is being utilized, the line and field frequencies of this standard being respectively designated by $F_H$ and $F_V$.

A basic sampling frequency $F_o$ of 6,250 c/s is used, which is a multiple of the field frequency $F_V$ with a view to its use for the sampling of the field-scan triggering signal of the camera and bearing in mind the requirements imposed by field interlacing. For reasons of technological convenience, $F_o$ is furthermore related in a simple manner with the line frequency $F_H$, in other words $F_o = 4 \times F_H/10$.

The frequency $F_o$ is furthermore utilized for the sampling of the two low-frequency signals of 2 kc/s bandwidth, for which it is entirely satisfactory and of the voltage used to control the pilot oscillator of the camera, which requires a bandwidth of at least 750 c/s. The frequency $2F_o$ is used for sampling the low-frequency signal of 4 kc/s and $F_o/10$ is used for the 40 service signals whose bandwidths do not exceed 200 c/s, this making it possible to reduce to $F_o\,(4 \times 1 + 2 + 40/10) = 10\ F_o$, the multiplex frequency $F_m$, this being equal to the number of component signals occurring per second in the time-multiplex signal.

Figure 2:
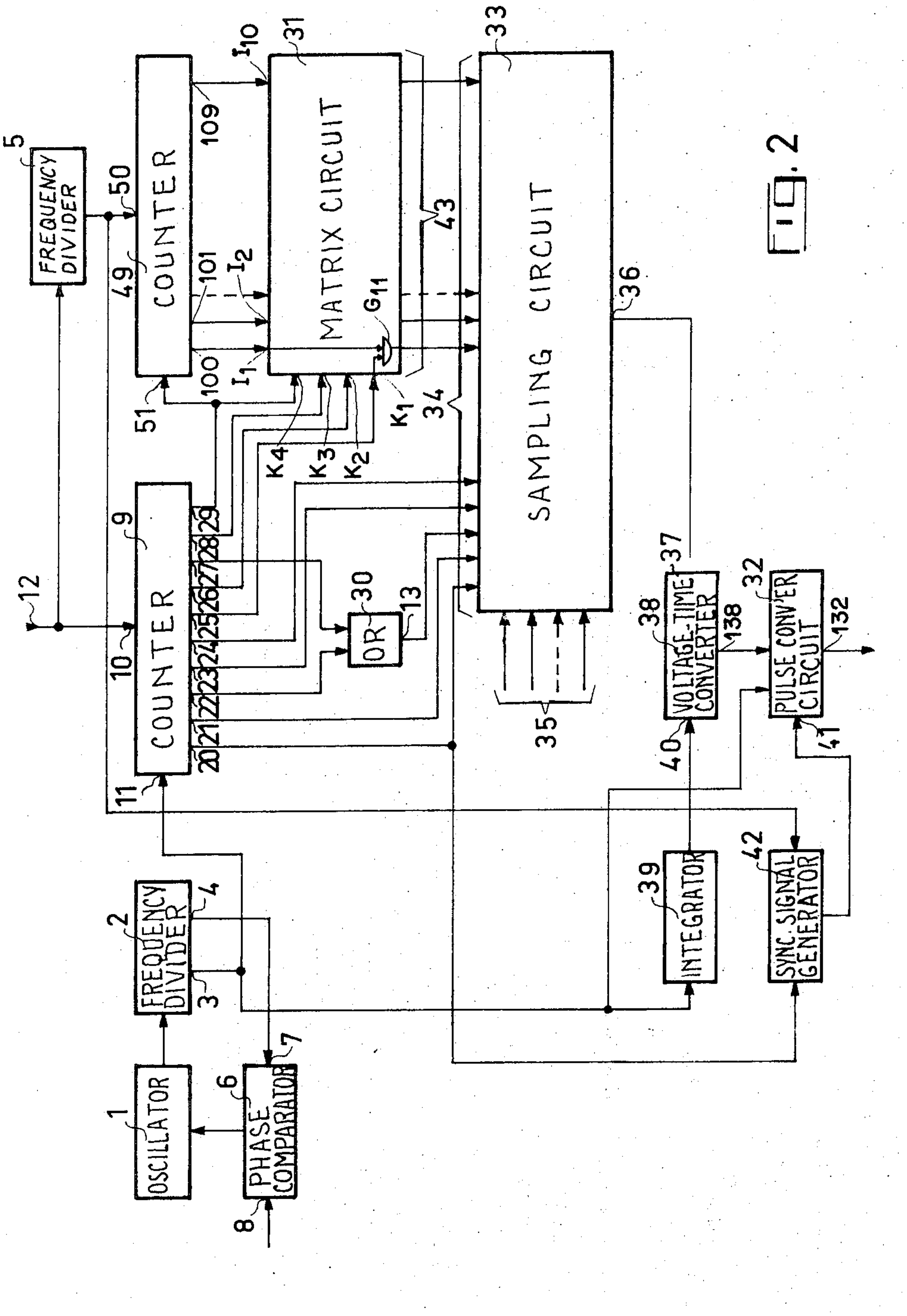

A corresponding embodiment of the device for generating the M signal, is shown in FIG. 2.

In FIG. 2, a pilot oscillator 1, with a phase-control input, supplies a rectangular waveform signal of frequency $2\ F_m = 20\ F_o = 8\ F_H$.

This oscillator 1 supplies a divider cascade 2 respectively producing at its outputs 3 and 4 the frequencies $F_m = 10\ F_o$ and $F_H$.

The oscillator 1 has its phase controlled through the line-scan frequency, by means of a phase comparator 6 supplied respectively at its inputs 7 and 8 with the signal of frequency $F_H$ produced by the divider cascade 2, and a phase reference signal of frequency $F_H$ coming from the sync. Signals arriving from outside, a central control, for example, at the control unit.

The output 3, producing frequency 10 $F_o$, of the divider cascade 2, supplies input 11 of a counter 9 which is a modulo-10 counter. The counter 9 has a reset input 10 supplied with the field scan triggering pulses coming from the outside source and injected at the input 12 of the device. The counter 9 has 10 outputs, 20 to 29, corresponding to its states 0 to 9, and supplies a pulse at that one of its outputs which corresponds to its particular count, each of its outputs thus supplying pulses at frequency $F_o$.

Figure 3B:
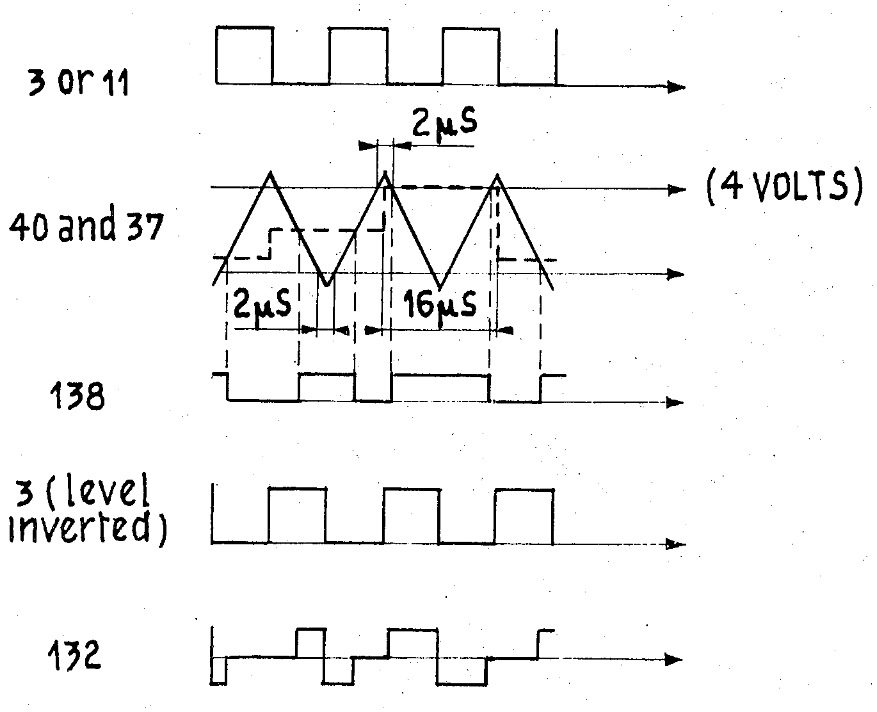
Figure 3A:
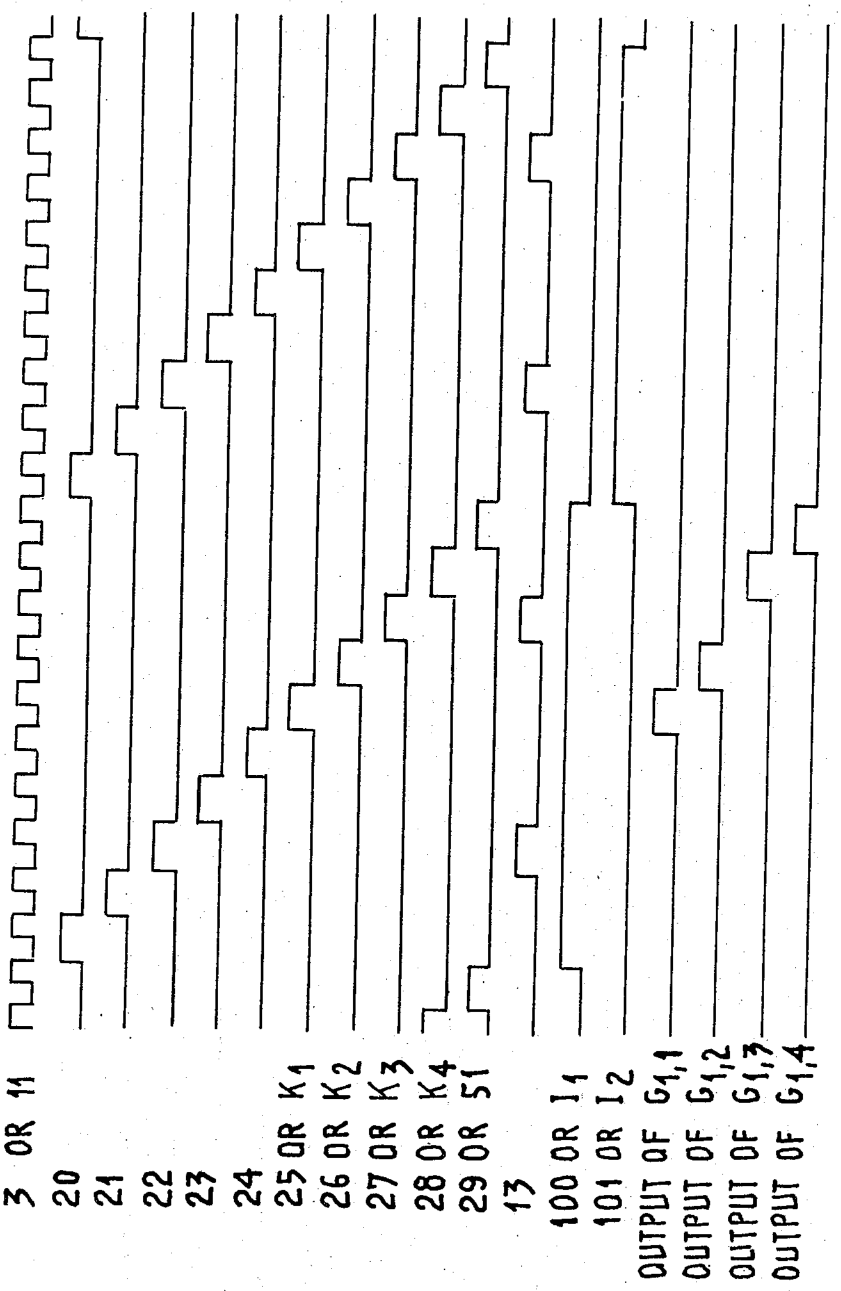

FIG. 3*a* shows the signals appearing at various terminals of FIG. 2, each signal being identified by the reference number of this terminal on the left-hand margin, or by two such reference numbers, where it appears at two terminals. FIG. 3*a* shows in particular the signals appearing at the input 11 and at the various outputs 20 to 29 of the counter 9, the trailing edges of the pulses applied at input 11 causing the counter to change its count.

The output 29 of the counter 9 supplies the input 51 of an identical counter 49 whose reset input 50 receives pulses at half the field frequency, that is to say at the picture-frequency, obtained by dividing the field-scan triggering pulses by 2, in a divider 5. The counter 49 has 10 outputs 100, 101 . . . 109 corresponding respectively to its 0 to 9 states. The signals appearing at outputs 100 and 101 have been shown in FIG. 3*a*.

The pulses at frequency $F_o$ appearing at the outputs 20, 21, 23 and 24 of the counter 9 are used respectively for the sampling of the phase-control signal of the camera oscillator, of the field-scan triggering signal, and of the two 2 kc/s bandwidth low-frequency signals. The pulses appearing at the outputs 22 and 27, are united in an OR-gate 30 whose output 13 produces pulses of frequency 2 $F_o$ for the smapling at this frequency of the 4 kc/s bandwidth low-frequency signal. The signal appearing at the output 13 of gate 30 is shown in FIG. 3*a*.

A circuit 31 formed by a matrix of 40 AND-gates, has two sets of inputs $K_1$, $K_2$, $K_3$ and $K_4$. The first set comprises four inputs respectively connected to the outputs 25, 26, 28 and 29 of the counter 9, each of which supplies pulses of $1/F_o = 16\ \mu s$ at a recurrence frequency of $F_o$. The second set of inputs of the matrix 31 has ten inputs $I_1$, $I_2$. . . $I_{10}$ respectively connected to the ten outputs 100 to 109 of the counter 49, these supplying pulses of 160 $\mu s$ at the recurrence frequency $F_o/10$. The matrix 31 comprises four rows and 10 columns of AND-gates respectively supplied by the two sets of inputs. In other words each AND-gate $G_{i,k}$ belonging to a column supplied by an input $I_i$ ($i = 1,2$ . . . or 10) of the matrix and to a row supplied by an input $K_k$ ($k = 1,2,3$ or 4) of the matrix has its inputs respectively supplied by inputs $I_i$ and $K_k$, and will deliver a pulse when input $I_i$ and $K_k$ are simultaneously energized. The outputs of the 40 AND-gates form the 40 outputs of the matrix. Only one such AND-gate, i.e., $G_{1,1}$, belonging to the first column and to the first row of the matrix has been shown, at an enlarged scale. FIG. 3*a* shows the output pulses from four gates $G_{1,1}$, $G_{1,2}$, $G_{1,3}$, $G_{1,4}$ (the last three not being shown in the drawing) whose first inputs are connected to input $I_1$ of the matrix and whose second inputs are respectively connected to inputs $K_1$, $K_2$, $K_3$ and $K_4$ of the matrix. Each of the 40 AND-gates, in the coincidence condition, thus produces 16 $\mu$s pulses at the recurrence frequency $F_o/10$ with a recurrence period of /3600 $\mu$s, at one of the 40 outputs 43 of the matrix 31, the 40 pulse trains thus obtained being utilized for sampling the 40 very narrowband signals. The sampling of each of the 45 narrowband signals is carried out in a conventional manner in 45 circuits whose output signals are combined in a single output. The assembly of this device is represented by the block 33 which receives the signals at its set of inputs 35 and the sampling pulses at its inputs 34, and sequentially produces the sampled signals at its output 36. The latter is connected to the first input 37 of a voltage-time converter 38, of known type, to the second input 40 of which an auxiliary "ramp" signal (with linear rise and decay portions of equal duration) at frequency $F_m = 10\ F_o$ is applied. This ramp is produced, by the integration in an integrator 39, of pulses of frequency $F_m = 10\ F_o$ supplied by the output 3 of the divider circuit 2, the d.c. component of those pulses being given a zero value. The pulses of frequency $F_m$ appearing at output 3 of the divider 2, which are the same as those appearing at input 11 of the counter 9 and the ramp signal appearing at input 40 of the converter 38 are shown in FIG. 3*b*, drawn at an enlarged scale relatively to FIG. 3*a*.

The signals applied to the set of inputs 35 have an amplitude ranging between 0 and 4 V.

Superimposed onto the ramp signal, successive ones of the samples applied to the input 37 of the converter 38 have been shown in dotted line in FIG. 3*b*. It has been assumed that the first and fourth (only shown in part) of those samples had a very small amplitude, that the third one had the maximum amplitude and that the second had an intermediate amplitude.

The converter 38 produces at its output 138 a zero signal as long as the signal applied to its input 40 exceeds the level of the signal applied to its input 37, and a 1 signal if the contrary is the case. It thus produces pulses of variable duration centered on the dips in the ramp signal. The three pulses appearing at the output 138 of the converter 38 for the three above mentioned samples are shown in FIG. 3*b*.

The amplitude and centering of the ramp signal are such that the duration of the output pulses from the converter 38 remains in the range between 2 and 14 $\mu$s, the bottom of it being designed to ensure, for synchronizing purposes, than an output signal is obtained which is centered on each of the dips in the ramp signal, whilst the top limit ensures that there is no crosstalk.

The output of the converter 38 is connected to the input of a converter circuit 32 which replaces each pulse of duration D by a positive pulse of duration D/2 followed immediately by a nagative pulse of the same duration. The pulses appearing at the output 132 of converter 32 are shown, in FIG. 3*b*. A comparison of the signals appearing at outputs 3 and 138 shows that the positive part of a pulse appearing at the output 132 can be obtained by coincidence between the corresponding pulse appearing at the output 138 and the previously level inverted signal delivered at output 3, and its negative part by coincidence between said pulse appearing at output 138 and the signal delivered at input 3, followed by an inversion of polarity, the two parts subsequently being united in an adder.

The diagram of FIG. 2, finally, comprises a device 42 for generating two sync. signals $S_1$ and $S_2$ which are intended for use in the receiving part. The signal $S_1$ at frequency $F_o$, is transmitted in the form of a boost in the amplitude of multiplex pulses corresponding to the phase control signal, the device 42 being supplied to this end with the output signals 20 from the counter 9. The sync. signal $S_2$, at the picture frequency, is constituted by the suppression at the picture frequency of a signal $S_1$. The device 42 is accordingly supplied with the signal of frequency $F_V/2$ from the divider 5. The output pulses are applied to the auxiliary input 41 of the converter circuit 32 where they are added with the proper width and, respectively, without and with polarity reversal to the positive and negative parts of the corresponding multiplex pulses in the adder which is utilized for the combination of their positive and negative parts.

It will be observed that the counter 9 cycles at the frequency $F_o$ which is a multiple of the field frequency. Its resetting to zero at the field frequency is intended to ensure that the field scanning triggering signal is sampled with a constant delay.

The resetting to zero at the picture frequency of the counter 49 makes it possible, in relation to an origin, to impose a well defined phase on the various pulses produced by the matrix 31. It is essential in this context that the frequency of this resetting operation should be a sub-multiple of $F_o/10 = 625$ c/s. This is achieved by using a resetting frequency of 25 c/s, namely the picture frequency $F_V/2$.

Figure 4:
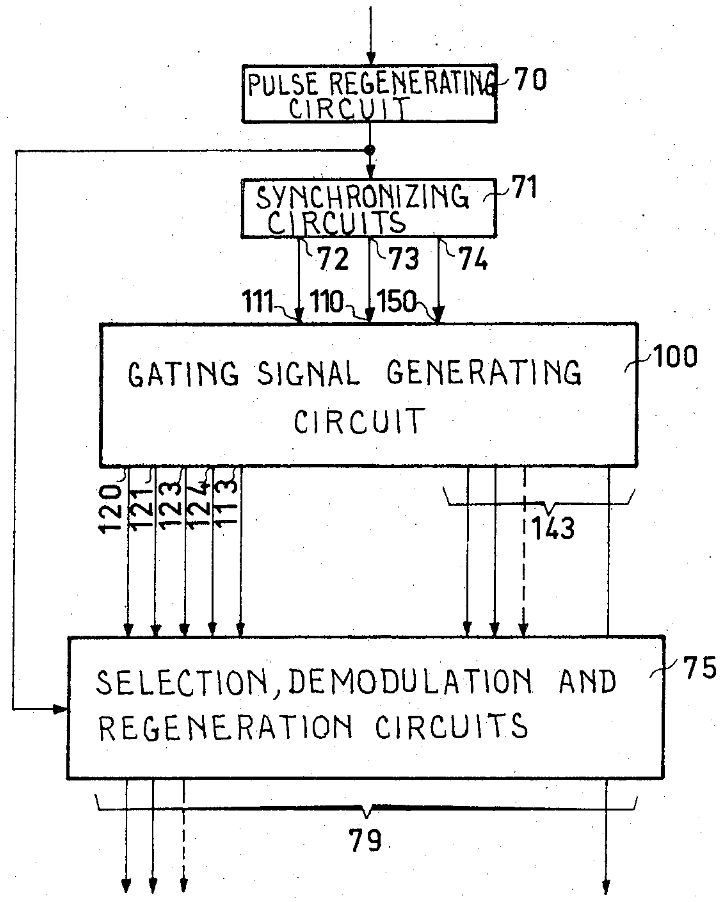
FIG. 4 is a diagram of an embodiment of a demultiplexing device cooperating with the multiplexing device of FIG. 2.

FIG. 4 illustrates the device utilized in the camera for de-multiplexing the M signal.

It comprises (following an input filter assigned to the M signal channel) a conventional pulse regenerating circuit 70 and a set of synchronizing circuits 71 supplied by the circuit 70 and producing at three outputs 72, 73, 74 respectively pulses of frequency $F_m$ the generation of which is triggered by the fronts of the multiplex pulses of the M signal, sync. signals $S_1$ at frequency $F_o$ obtained by amplitude discrimination of these pulses, and field frequency signals $S_2$ obtained by using a monostable multivibrator stage supplied with the pulses $S_1$ and maintained in its quasi-stable state as long as said pulses succeed one another regularly at frequency $F_o$, but reverting to its stable state when the gap employed for the transmission of the signal $S_2$ occurs.

Following the circuits 71, the demultiplexing device comprises for the generation of the gating signals for demultiplexing the M signal, an assembly formed in exactly the same way as the assembly formed by the counter 9, the counter 49 and the OR-gate 30 of the control unit. This assembly is illustrated in a general way in FIG. 4 by block 100 with the inputs 111, 110, 150 corresponding respectively to the inputs 11, 10 and 50 of the circuit of FIG. 2.

The inputs 111, in place of the pulses at frequency $F_m = 10\ F_o$ produced at the transmitting end by the divider circuit 2 and supplied to the input 11 of the counter 9, receives the pulses produced by the output 72 of the circuits 71; the input 110, instead of the pulses of field frequency which were supplied to the reset input 10 of the counter 9, recieves the sync. signals $S_1$ of frequency $F_o$ produced by the output 73 of the circuits 71, the pulses of freuqnency $F_o$ providing the necessary synchronism between the transmitting and receiving circuits. Finally, the input 150, instead of the picture frequency pulses which the reset input 50 of the counter 49 of the control unit received, receives the signals $S_2$ which have the same frequency, from the output 74.

Having thus ensured synchronism, at the 45 outputs of the unit 100, which outputs are formed by the 40 outputs 143 corresponding to the 40 outputs 43 of the matrix 31 of the control unit, the outputs 120, 121, 123 and 124 corresponding to the outputs 20, 21, 23 and 24 of the counter 9 of the control unit, and the output 113, corresponding to the output 13 of the OR-gate 30, of the control unit, 45 selection pulse trains each corresponding to one of the multiplexed signals and constituted by pulses having the same fronts as the multiplexed pulses and the duration $1/F_m$ which is always greater than that of the latter, are obtained. These thus make it possible to select by a coincidence process, the multiplex pulses corresponding to each signal.

The selection, demodulation and regeneration can then be carried out in a conventional fashion in a set of circuits illustrated overall by the unit 75 which is supplied on the one hand with the multiplex pulses of the circuits 70 and on the other with 45 sets of selection pulses, the demoudlated signals being respectively produced at the 45 outputs 79 of the said circuits 75.

As far as the demodulation of the signal *d* in FIG. 3, is concerned, it is possible to utilize pulses of one polarity only or, better still, to carry out a double-alternation or "push-pull" technique of demodulation.

Figure 5:
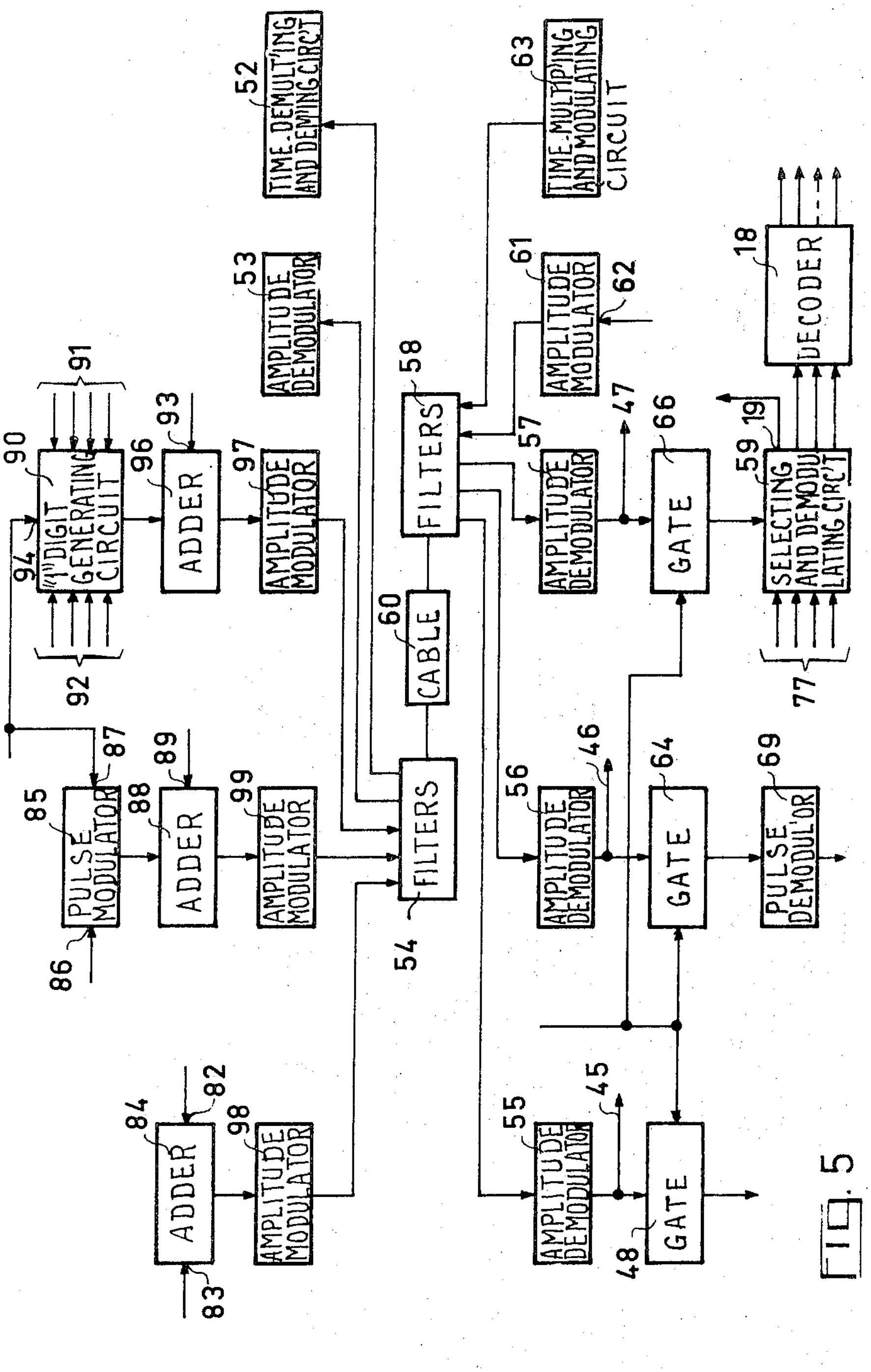
FIG. 5 is the general diagram of a transmission device in accordance with the invention.

FIG. 5 illustrates the transmitting and receiving circuits in the camera and in the control unit, as well as the device for adding the narrow-band signals to the three video signals generated in the camera during the "interim" or "pseudo" horizontal blanking intervals (slightly curtailed horinzontal blanking intervals). These additions are carried out in the following manner:

The phase reference signal of the camera is transmitted in the form of a pulse added to the pseudo-luminance signal during the back porch of the horizontal blanking intervals. The wide-band channel is preferred since it makes it possible to achieve a sufficiently steep front in this reference pulse. This operation of addition is effected in the adder 84 of FIG. 5 whose inputs 82 and 83 are respectively supplied with the pseudo-luminance signal and the phase reference signal.

The interphone signal is transmitted by amplitude-modulated pulses, a pulse of this kind being added, during each back porch of a horizontal blanking interval, to the red video signal. To this end, a pulse modulator 85 is supplied at its input 86 with the interphone signal and at its input 87 with line frequency pulses of correct phase hereinafter referred to as I pulses. The modulated pulses thus obtained are supplied to one input of an adder 88 whose second input 89 is supplied with the red signal.

Two narrow-band signals, namely a remote-control signal relating to the view-finder, which may be one or other of eight mutually exclusive commands, and the channel call, are transmitted in the blue video channel.

The remote-control signal is translated by a three-digit binary number which can express one or the other of the eight possible commands. A digit 1 is translated by five pulses located in the pseudo-blanking intervals of five successive lines of a field, and a digit zero by the absence of these pulses. A fourth digit is translated in the same way for purposes of the channel call. The line concerned by each of the four digits (first, second or third digit of the view-finder remote-control signal, and channel call digit), are determined in the camera by pulses, which will be referred to as pulses J, of around 320 $\mu$s, in other words five times the line-scan period which is 64 $\mu$s, obtained by the addition of two approximately 160 $\mu$s long pulses coming from two successive predetermined outputs of the counter of the unit 100 in FIG. 4, corresponding to the counter 49 of FIG. 2. Naturally, four completely separate pairs of outputs are used for the formation of the pulses J corresponding to the four "digits." For the corresponding demultiplexing operation, in the control unit, pulses J' of exactly 320 $\mu$s and formed in the same fashion with the help of output pulses from the counter 49, are used, the pairs of outputs involved being of course the same as those which are utilised in the corresponding counter in the camera.

This being so, in FIG. 5 a circuit 90 receives the four digits for transmission at its inputs 92, the corresponding pulses J at its inputs 91 an the pulses I hereinbefore referred to, of line frequency, at its input 94. For each digit of value 1 which is to be transmitted, five pulses I are picked off by coincidence with the pulse J corresponding to said digit.

The output pulses from the circuit 90 are applied to the first input of an adder 96 whose second input 93 receives the blue video signal.

The outputs of the adders 84, 88 and 96 are respectively connected to the modulating inputs of three amplitude modulators 98, 99 and 97.

The camera circuits also provide a demodulation circuit with a video demodulator preceded by a variable-gain amplifier, for the demodulation of the view-finder video signal, and the time-demultiplexing and demodulation circuit of FIG. 4 represented in a general way here by the block 52. The outputs of the three modulators and the inputs of the circuits 52 and 53 are connected to a unit 54 comprising transmission and reception filters.

This set of filters supplies to the cable 60 the output signals from the circuits 98, 99 and 97 feeds the circuits 53 and 52.

At the other end of the link, in the control unit, there are the demodulation circuits 55, 56 and 57 each comprising a demodulator preceded by a variable-gain amplifier, these circuits being respectively assigned to the demodulation of the pseudo-luminance, red and blue video signals, and being supplied by the outputs of a set 58 of transmission and reception filters which receive the composite signal from the cable 60.

The circuits of the control unit furthermore comprise a modulator 61 which receives the veiw-finder video signal at its input 62 and the time-multiplexing and modulating circuit of FIG. 2 which is illustrated here in a general way by the block 63.

The outputs of the circuits 61, 63 are connected to two inputs of the filter unit 58.

The gain of the variable-gain amplifiers in the demodulation circuits 53, 55, 56 and 57 is controlled by an additional reference pulse added in the horizontal blanking back porches of the corresponding video signals and of opposite sign to the image signals and the other pulses.

The output signals from the demodulation circuits 55, 56 and 57 are supplied at their respective outputs 45, 46 and 47, for the injection of the final blanking signals, and on the other hand respectively to three gates 48, 64 and 66 which are unblocked via their second inputs by signals which cover the pseudo-horizontal blanking intervals.

The gate 48 supplies the phase reference signal.

The output pulses from the gate 64 are applied to a demodulator 69 producing the interphone signal.

The output pulses from the gate 66 are applied to a selecting and demodulating circuit 59 whose inputs 77 receive the signals J′ corresponding to four digits and whose three outputs produce the three view-finder remote-control digits, a fourth output 19 producing the channel call digit.

The first three outputs are connected to the inputs of a decoder 18 whose eight outputs supply the eight possible commands for the remote-control of the view-finder.

It will be observed that the pulses J and J′ are not always in phase because of the transit times for the go and return through the cable, so that one of the five pulses may be lost from a group at the time of demultiplexing and occur in the next group. To avoid any error as a consequence of this, the detection of the value of a group is effected in the circuits 59 by integration or counting, the presence of three pulses being required in order to assign the value 1 to a group.

It should be borne in mind that the invention is open to variant embodiments which are within the scope of the person skilled in the art.

Thus, for the formation of the M signal, the following procedure might for example be adopted:

Firts of all the translation of the samples into the form of binary digital signals using a coding system which produces a constant direct component (independent of the information), followed by the subsequent elimination of this direct component.

As far as the different sampling frequencies utilized for the formation of the M signal, are concerned, it is pointed out that the utilization of separate sampling frequencies as a function of the bandwidths of the signals being transmitted, makes it possible to reduce the multiplex frequency.

If $N_1$ signals are sampled at frequency $p\ F_o$, $N_2$ at the basic frequency $F_o$, and $N_3$ at the frequency $F_o/q$, where $p$ and $q$ are whole numbers greater than 1, then the multiplex frequency becomes $$F_o\ (p\ N_1 + N_2 + N'_3)$$

where $N'_3$ is equal to $N_3/q$ if the latter is a whole number, and to the immediately higher whole number if the contrary is the case.

Of course, the invention is not limited to the embodiments described and shown which were given solely by way of example.

What is claimed is:

1. A transmission device for multiplex transmission, in a given frequency band, between a television camera and its control unit, said camera being operated at a given field frequency, said device comprising: a transmission cable inserted between said camera and said control unit; and, within the control unit, first means for producing, out of a plurality of narrow band signals to be transmitted to the camera, a time-multiplex signal whose d.c. component is zero, and second means for simultaneously applying to said cable, for transmission to said camera, electrical power at zero frequency and said time-multiplex signal; said first means comprising a generator producing a basic frequency $F_o$, $F_o$ being a multiple of said field frequency; means for deriving from said basic frequency an auxiliary sampling frequency $F_o/q$ where $q$ is an integer greater than 1; and a sampling circuit receiving said basic frequency and said auxiliary frequency $F_o/q$ for sampling at least one of said narrow band signals at said basic frequency and for sampling at least another one of said narrow band signals at said auxiliary frequency $F_o/q$.

2. A transmission device for multiplex transmission, in a given frequency band, between a television camera and its control unit, said camera being operated at a given field frequency, and being a colour television camera generating three video signals, said transmission device comprising: a transmission cable inserted between said camera and said control unit; and, within the control unit, first means for producing, out of a plurality of narrow band signals to be transmitted to the camera, a time-multiplex signal whose d.c. component is zero, and second means for simultaneously applying to said cable, for transmission to said camera, electrical power at zero frequency and said time-multiplex signal; said first means comprising a generator producing a basic frequency $F_o$, $F_o$ being a multiple of said field frequency, means for deriving from said basic frequency an auxiliary sampling frequency $F_o/q$ where $q$ is an integer greater than 1; and a sampling circuit receiving said basic frequency and said auxiliary frequency $F_o/q$ for sampling at least one of said narrow band signals at said basic frequency and for sampling at least another one of said narrow band signals at said auxiliary frequency $F_o/q$; said transmission device further comprising, within the camera, means for the addition to said three video signals, during horizontal blanking intervals, of code pulse signals representative of auxiliary signals of smaller bandwidth than said video signals, means for modulating said three video signals together with said code pulse signals respectively on three carriers and means for applying the resulting modulated carriers to said cable.

3. A transmission device for multiplex transmission, in a given frequency band, between a television camera and its control unit, said camera being operated at a given field frequency, and being a colour television camera generating three video signals, said transmission device comprising: a transmission cable inserted between said camera and said control unit; and, within the control unit, first means, for producing, out of a plurality of narrow band signals to be transmitted to the camera, a time-multiplex signal whose d.c. component is zero and second means for simultaneously applying to said cable, for transmission to said camera, electrical power at zero frequency and said time-multiplex signal; said first means comprising a generator producing a basic frequency $F_o$, $F_o$ being a multiple of said field frequency, means for deriving from said basic frequency an auxiliary sampling freuqncy $F_o/q$ where $q$ is an integer greater than 1; and a sampling circuit receiving said basic frequency and said auxiliary frequency $F_o/q$ for sampling at least one of said narrow band signals at said basic frequency and for sampling at least another one of said narrow band signals at said auxiliary frequency $F_o/q$; said time multiplex signal being formed by width-modulated pulses, respectively representative of the samples delivered by said sampling circuit, and each of said width-modulated pulses comprising first and second portions having opposite polarities and the same duration.

4. A transmission device as claimed in claim 1, wherein said first means further comprise means connected to said generator for producing a frueqnecy $p \cdot F_o$, where $p$ is an integer greater than 1, and wherein said sampling circuit comprises $N_1$ inputs receiving said frequency $p \cdot F_o$, $N_2$ inputs receiving said frequency $F_o$ and $N_3$ inputs receiving said frequency $F_o/q$, where $N_1$, $N_2$, $H_3$ are positive integers whose sum is equal to the number of signals of said and where $p$ and $q$ are positive integers greater than 1.

5. A transmission device as claimed in claim 2, further comprising in said control unit modulating means for modulating a video signal intended for said camera and wherein said three carriers, modulated by said video signals generated by the camera, occupy frequency channels located between the channel occupied by the time-multiplex signal and the channel occupied by the carrier modulated by said video signal intended for said camera.

* * * * *